March 12, 1957 H. C. GILLESPIE ET AL 2,785,264

HIGH FREQUENCY DIELECTRIC HEATING SYSTEM

Filed Jan. 29, 1953 2 Sheets-Sheet 1

INVENTORS.
Henderson C. Gillespie
& Joseph E. Joy
BY Morris Rabkin
ATTORNEY.

HIGH FREQUENCY DIELECTRIC HEATING SYSTEM

Filed Jan. 29, 1953

INVENTORS.
Henderson C. Gillespie
& Joseph E. Joy
BY Morris Rabkin
ATTORNEY.

United States Patent Office 2,785,264

Patented Mar. 12, 1957

2,785,264

HIGH FREQUENCY DIELECTRIC HEATING SYSTEM

Henderson C. Gillespie, Moorestown, and Joseph E. Joy, Collingswood, N. J., assignors to Radio Corporation of America, a corporation of Delaware Application January 29, 1953, Serial No. 333,887

17 Claims. (Cl. 219—10.77)

This invention relates to a protective system for high frequency dielectric heating systems, and more particularly to a system for protecting the load electrodes of such heating systems, as well as the work to be heated, from damage due to arcing between the load electrodes.

In high-frequency dielectric heating systems, the work to be heated is placed between or adjacent to a pair of load electrodes to which a radio-frequency voltage from a high-frequency power oscillator is applied. As a result, of this applied voltage, an arc sometimes forms which can result in damage to the work, the electrodes, and the oscillator tube.

Various systems for protecting against damage due to arcing have been developed. These protective systems generally utilize circuit-breaking relays for disconnecting the power supply from the high-frequency oscillator upon the formation of an arc. Such protective systems are described in the U. S. patents to J. E. Walstrom, No. 2,548,246, and J. M. Stone, No. 2,454,618. However, relays are relatively slow-operating mechanisms; the period of operation of an electromechanical relay to cut off the power oscillator is of the order of several milliseconds. An arc lasting for that length of time may result in significant damage to the load electrodes such as would require costly and time-consuming repairs. Therefore, it would be desirable to reduce the time needed for stopping an arc once it occurs, and better still, to stop the formation of an arc substantially simultaneously with its formation.

Accordingly, it is an object of this invention to provide an improved protective system for a high-frequency dielectric heating system to prevent damage due to arcing.

Another object of this invention is to provide a fast-action electronic protective system to render inactive the power oscillator of a high-frequency dielectric heating system upon the formation of an arc between the load electrodes.

Still another object of this invention is to provide a new and improved protective system for a high-frequency dielectric heating system which detects the conditions leading to arcing between the load electrodes whereby the power oscillator may be rendered inactive before any damage is done.

These and other objects of this invention are achieved in a high-frequency dielectric heating system in which a generator, or power oscillator, supplies high-frequency voltage to a pair of load electrodes and, thereby, to the work to be heated. The protective system includes detecting or probe means for producing a voltage signal upon the formation of an arc or upon the occurrence of conditions leading to such formation; a circuit for producing a pulse in response to the voltage signal; a keying circuit, or electronic relay, which is triggered by the pulse and applies a bias blocking potential to the control grid of the generator tube to bias it off and terminate the power output to the load electrodes; and a holding relay which maintains the keying circuit in triggered condition as long as arcing conditions continue.

The detecting or probe means of this invention is embodied in three alternative forms. In one, a direct voltage is applied across the load electrodes by means of a voltage divider. Upon the occurrence of arcing between the electrodes, the resistance across the electrodes decreases from an infinite value, and, therefore, the direct voltage across the load electrodes decreases to actuate the pulse-producing circuit. In a second embodiment, the high-frequency voltage across the load electrodes is sampled and rectified. Upon the occurrence of conditions leading to the formation of an arc, the rectified voltage decreases to produce the actuating voltage signal. In a third embodiment, a relatively low-power oscillator is used as the probe means by coupling the load electrodes to the plate circuit thereof. The frequency of this detecting oscillator is substantially less than that of the power generator. Under conditions leading to arcing, the capacitance across the load electrodes decreases which results in a decrease in the negative grid voltage of the detecting oscillator. This change in grid voltage is used as the actuating voltage signal.

The novel features of this invention, both as to its organization and method of operation, may be best understood from the following description when read together with the accompanying drawings in which.

Figure 1:
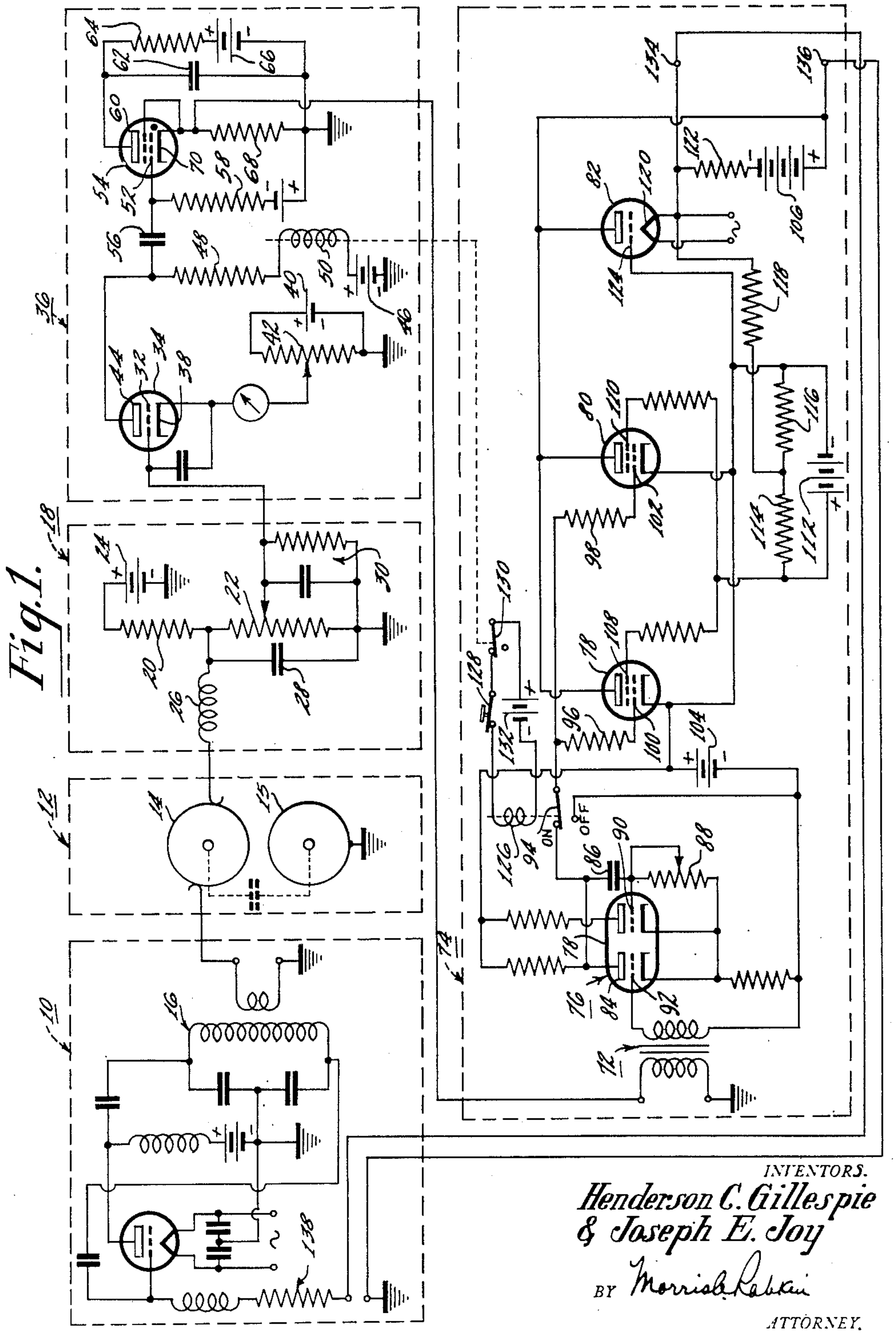
Figure 1 shows a schematic circuit diagram of a protective system for a high-frequency dielectric heating system, separate circuit portions being shown in broken line blocks.

Referring now to Figure 1, a high-frequency dielectric heating system is shown in which a generator 10 supplies high-frequency oscillations to a load 12 in the form of a pair of electrodes 14, 15. The generator, shown in Figure 1, is a Colpitts oscillator, which is a well known form of power oscillator and is discussed in Reich "Theory and Application of Electron Tubes" at page 391. The load electrodes 14, 15 are shown in the form of spaced rollers which receive the dielectric work to be heated as it moves between them. The load electrodes are coupled to the tank circuit 16 of the generator 10 and present a capacitance thereto.

The output of the generator applies a high voltage across the load electrodes so that arcing may take place when the dielectric work breaks down. In order to detect the formation of such an arc, a probe or detecting circuit 18 is coupled to one of the electrodes 14. The probe is used to apply a direct voltage across the electrodes. The probe 18 is shown in the form of a voltage divider made up of a first and second resistor 20, 22 with a source of direct voltage 24 applied across the resistors. The junction of the resistors 20, 22 is coupled to the upper load electrode 14 through an R.-F. choke 26 to keep the high frequency oscillations from the direct voltage source 24. A by-pass capacitor 28 across the second resistor 22 is also provided for this purpose. The second resistor 20 of the voltage divider is a variable resistor and it is coupled through a filter network 30 to the control grid 32 of an amplifier tube 34 which forms a portion of a pulse producing circuit 36. The cathode 38 of the amplifier tube 34 is connected to a source of biasing potential 40 through a variable resistor 42, and the anode 44 of the tube is connected to a source of operating potential 46 through a load resistor 48 and the coil 50 of a relay (which is described in further detail below). The anode 44 of the amplifier tube 34 is coupled to the control grid 52 of a thyratron 54 through a capacitor 56. The control grid 52 of the thyratron is negatively biased through a grid resistor 58, and the anode 60 is connected to a charging capacitor 62 which is connected across a resistor 64 and a source of operating potential 66. A cathode resistor 68 is connected to the cathode 70 of the thyratron, and an output from the circuit is taken from that cathode 70. This output is applied to the primary of a pulse transformer 72 in a keying circuit 74.

The circuit described thus far operates as follows: A direct voltage is normally applied across the load electrodes, which voltage is the voltage drop across the variable resistor 22 in the voltage divider of the probe circuit 18. The positive bias applied to the cathode 38 of the amplifier tube 34 is balanced by adjusting the variable resistor 22 in the voltage divider so that the amplifier tube is normally biased for conduction. When an arc forms between the load electrodes 14, 15, the resistance across the electrodes 14, 15 decreases from an infinite value, so that the potential drop across the variable resistor 22 of the voltage divider also decreases. This, in turn, decreases the grid bias applied from the variable resistor 22 so that the amplifier tube 34 is effectively biased to cutoff. Due to the balance of grid and cathode bias, a relatively small decrease in grid voltage is sufficient to cut off anode current. The anode voltage of the amplifier tube 34 rises as a result and a positive pulse is applied to the control grid 52 of the thyratron 54 to fire that tube. As the thyratron fires, it discharges the charging capacitor 62, at which point the anode potential is reduced so that tube is extinguished, and a positive-going pulse is applied from the cathode 70 of the thyratron to the pulse transformer 72 of the keying circuit 74.

The keying circuit 74 is made up of a trigger circuit 76 which receives its input from the secondary of the pulse transformer 72, a pair of keying tubes 78, 80 and a keying relay tube 82. The trigger circuit 76, as shown, is a unistable multivibrator in which a duo-triode 78 is used. The anode 84 of the left tube is coupled through a capacitor 86 and grid resistor 88 to the control grid 90 of the right tube. The control grid 92 of the left tube receives input pulses from the secondary of the pulse transformer 72. The anode 84 of the left tube is also connected through a relay switch 94 in the "on" position and separate grid resistors 96, 98 to the control grids 100, 102 of the keying tubes 78, 80. When the switch 94 is in the "off" position, the control grids 100, 102 of the keying tubes 78, 80 are connected to the negative side of a source of operating potential 104, the positive side of which is connected to the anodes of the trigger circuit tubes through separate anode load resistors. The anodes of the keying tubes 78, 80 and the relay tube 82 receive their supply potential from the positive side of a keying potential source 106. The screen grids 108, 110 of the keying tubes are connected through separate resistors to the positive side of a source of screen potential 112, across which is connected a voltage divider which is made up of a first and second resistor 114, 116. The junction of this voltage divider is connected through a cathode resistor 118, to the cathode 120 of the relay tube 82, and through a load resistor 122 to the negative side of the source of keying potential 106. The control grid 124 of the keying relay tube 82 is connected to the negative side of the screen potential source 112. The switch 94 in the output of the trigger circuit 76 is controlled by a relay coil 126 connected in series with a manual start-stop switch 128, an auxiliary relay switch 130 controlled by the relay coil 50 in the anode circuit of the amplifier tube 34, and a source of potential 132. The keying potential source 106 is connected through a pair of terminals 134, 136 in series with the D.-C. grid circuit 138 of the tube of the generator 10 when the keying circuit 74 is actuated in the manner now described.

The right tube of the trigger circuit 76 is normally conducting, and the left tube is cutoff. This is due to the effective negative bias on the control grid 92 of the left tube produced by the potential drop across the common cathode resistor, and to the normal zero effective bias on the control grid 70 of the right tube. Thus, the anode 84 of the left tube is at the potential of the source 104 connected thereto, so that the positive side of that source 104 is connected through the normally closed relay switch 94 to the control grids 100, 102 of the keying tubes 78, 80. Therefore, these tubes 78, 80 are at zero effective bias and are normally conducting. The keying tubes 78, 80 draw current from the positive side of the keying potential source 106, which flows from the cathodes of those tubes through the second resistor 116 of the voltage divider across the screen potential source 112 and through the cathode and load resistors 118, 122 back to the negative side of the keying potential source. The potential drop across the second resistor 116 of the voltage divider due to this current flow is opposed by the voltage drop due to current flow from the screen grid source 112. The bias applied to the control grid 124 of the keying relay tube 82 is the difference between these two voltage drops which is highly positive. The internal impedance of the relay tube 82 is very small, and since it conducts heavily due to the applied bias, the output terminals 134, 136 of the keying circuit, being shunted by the relay tube 82, are effectively at the same potential, and there is no blocking bias potential applied to the grid circuit 138 of the generator 10.

When a pulse is applied to the primary of the pulse transformer 74 from the pulse-producing circuit 36 upon the formation of an arc, a positive pulse is produced in the secondary and applied to the control grid 92 of the left tube of the trigger circuit 76, rendering that tube conductive. The voltage at the anode 84 of the left tube decreases so that a negative pulse is applied to the control grid of the right tube cutting that tube off. The decrease in anode voltage is also applied through the relay switch 94 to the control grids 100, 102 of the keying tubes 78, 80, cutting those tubes off. With the current through the keying tubes 78, 80 cut off, the positive potential produced by that current across the second resistor 116 of the voltage divider is no longer available, and the grid voltage of the relay tube 82 is that of the negative screen grid source 112 connected thereto. Thus, the impedance of the relay tube 82 increases sharply, cutting that tube off. Since current is no longer drawn by the relay tube 82 from the keying potential source 106 through the load resistor 118, the full potential of that source 106 is applied to the output terminals 134, 136, and, thus, is placed in series with the grid circuit 138 of the generator 10. This large negative bias applied to the grid of the generator tube sharply increases the impedance of that tube so that the power output from the tube is terminated.

Thus, it is seen that when an arc forms across the load electrodes 14, 15 decreasing the resistance thereacross, this is detected by the change in voltage across the variable resistor 20 of the probe circuit 18. This change in voltage is amplified to fire the thyratron 54, which in turn actuates the keying circuit to apply a blocking bias voltage to the power generator 10.

When an arc forms, and as long as it continues, the grid voltage of the amplifier tube 34 is at cutoff, so that there is no current drawn through the anode circuit of the amplifier tube 34 and, thus, through the relay coil 50 in that circuit. Therefore, the switch 130 operated by that relay coil 50 opens to de-energize the relay 126 in the trigger circuit output. Thus, the relay switch 94 moves from the "on" to the "off" position to break the circuit from the trigger circuit 76 to the control grids 100, 102 of the keying tubes 78, 80, and to make the circuit connecting those control grids 100, 102 to the negative side of the source of operating potential 104. In that way, a negative bias is maintained on the keying tubes 78, 80 as long as the arcing condition exists.

The trigger circuit 76 remains in actuated condition with the left tube conducting until the coupling capacitor 86 discharges through the grid resistor 88 to remove the negative bias on the grid of the right tube. The time constant for this discharge may be varied by adjusting the grid resistor 88. Within a fraction of a second, the damaged portion of the work to be heated may be moved past the roller electrodes 14, 15 and the time constant of the trigger circuit 76 can be set for the circuit to be restored to its deactuated condition at this time. However, the relay switch 94 remains in the "off" position maintaining the keying tubes in triggered condition as long as the arcing continues. When the arcing condition terminates, as when the work is moved past the load electrodes, the positive grid bias on the amplifier tube 34 is restored to render that tube conductive. Thus, the coil 50 of the auxiliary relay is energized, and the relay switch 94 is returned to the "on" position, so that the keying circuit 74 is in condition to receive another actuating pulse.

This invention is not restricted in its utility to the particular form of generator or load electrodes shown. For example, the invention may also be used with stationary plate electrodes.

Figure 2:
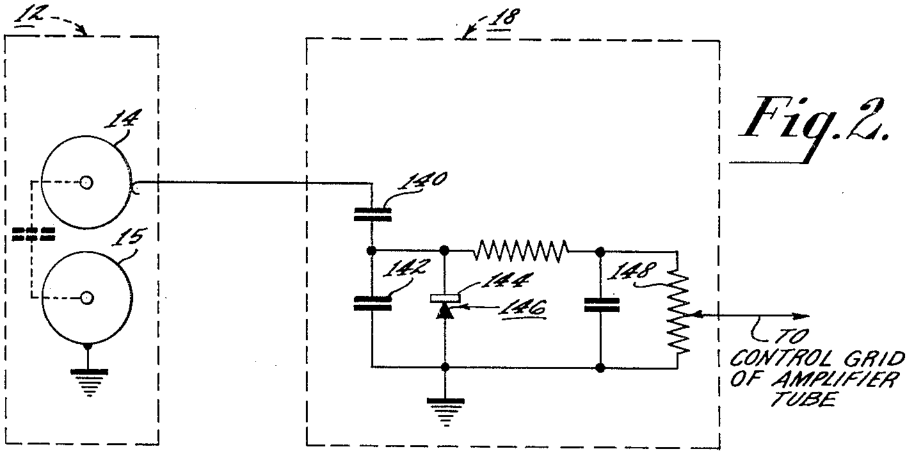
Figure 2 shows a schematic circuit diagram of an alternative circuit embodying this invention for detecting the formation of an arc across the load electrodes.

An alternative system for detecting the formation of an arc across the load electrodes is shown in Figure 2. Here again, the load electrodes 14, 15 are shown in the form of rollers although they may equally well be flat platens. In this embodiment of the probe or detecting circuit 18, the high-frequency voltage across the load electrodes is sampled by means of a voltage divider made up of a first and second capacitor 140, 142 connected in series across the load electrodes. The junction of the capacitors is connected to the cathode 144 of a rectifier 146 which is connected across the second capacitor 142. Also connected across the rectifier 146 is a filter network and a variable resistor 148. The variable resistor 148 is connected to the control grid 32 of the amplifier tube 34 of the pulse-producing circuit 36, in the manner described with respect to Figure 1, for the first embodiment of this invention.

The rectifier 146 rectifies a portion of the high-frequency voltage across the load electrodes 14, 15 so that a positive potential normally exists across the variable resistor 148. This resistor is adjusted, in the manner described above, to balance the bias potential applied to the cathode 38 of the amplifier tube 34, so that the tube is normally conducting. When an arc forms across the load electrodes, the voltage across them decreases so that the sample rectified voltage also decreases. Therefore, the voltage applied to the control grid 32 of the amplifier 34 through the variable resistor 148 likewise decreases below cutoff, so that the amplifier stops conducting. As described above, the thyratron 54 is thereby fired to actuate the keying circuit 74 and terminate the power output from the generator. This embodiment has the advantage that arcing does not actually have to occur before the protective system is actuated to terminate the generator output. A relatively small change in voltage across the load electrodes, which occurs when arcing is about to take place, is detected by the probe circuit to cut off the amplifier and actuate the rest of the protective system to terminate the power output.

Figure 3:
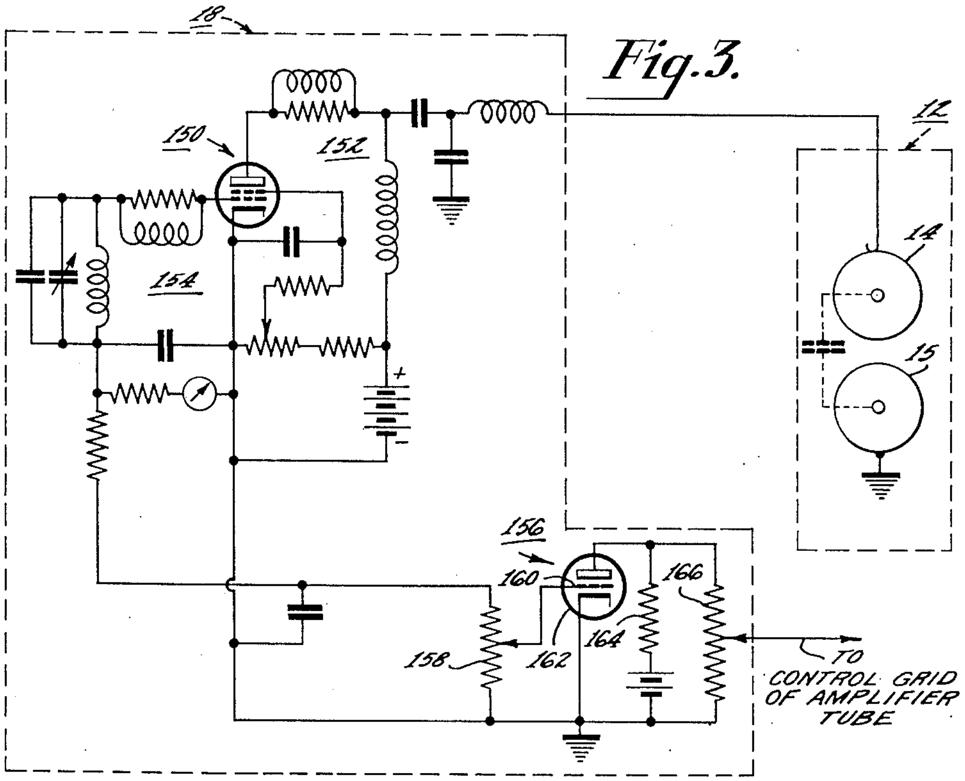
Figure 3 shows another alternative circuit embodying this invention for detecting the formation of an arc across the load electrodes.

In Figure 3, another detecting circuit embodying this invention is shown. In this circuit, a second oscillator 150 is used to detect the formation of an arc. The oscillator shown, is of the tuned-plate-tuned-grid type, a well known form of oscillator discussed in Reich, cited above, at page 392. The oscillator 150 is shown with part of its plate circuit consisting of the capacitance between the load electrodes 14, 15. The invention is not restricted in its utility to the specific form of oscillator shown. This oscillator should be a relatively low-power, low-frequency oscillator. The frequency of the oscillator should be low enough (substantially lower than the power generator frequency) so that there are no standing waves on the electrodes. Expressed in terms of wavelength of the oscillations, a tenth wavelength should be greater than the length of the load electrodes.

When the conditions leading to the formation of an arc occur, the capacitance across the load electrodes 14, 15 changes. As a result, there is a change in the frequency of the plate circuit which results in a change in grid voltage. This change in grid voltage, which is a decrease in negative voltage, is used to actuate the pulse producing circuit 36 in order to key off the power generator 10.

Since a decrease in negative voltage at the grid of the detecting oscillator 150 is an increase in absolute voltage, a phase inverting circuit 156 is used to couple the oscillator grid circuit to the amplifier tube 34. The oscillator grid voltage is applied across a variable resistor 158 which is connected to the control grid 160 of a phase inverter tube 162. The anode load resistor 164 of the tube 162 and a variable resistor 166 make up a voltage divider. The variable resistor 166 of the voltage divider is connected to the control grid 32 of the amplifier tube 34 in the pulse-producing circuit 36. By tuning the grid circuit 154 of the detecting oscillator 150, the voltage applied to the phase inverting circuit 156 may be adjusted. The variable resistor 166 in the anode circuit of the phase inverter tube may be adjusted, in the manner described above, to balance the bias applied to the cathode 38 of the amplifier tube 34.

This probe circuit detects the formation of an arc and produces the voltage signal for keying off the power generator 10. When there is a decrease in capacitance across the load electrodes, there is a decrease in negative grid voltage of the detecting oscillator 150 which is inverted by the phase-inverter circuit 156 and applied to the grid 32 of the amplifier as an increase in negative voltage. Thus, as described above, the thyratron 54 is fired and the keying circuit 74 actuated to terminate the power output from the generator 10.

As described with respect to the circuit of Figure 1, as long as the conditions for the formation of an arc exist, the amplifier tube 34 is maintained cutoff, the auxiliary relay coil 50 is de-energized, and the relay switch 94 is in "off" position, so that the keying circuit 74 is maintained in triggered condition and the generator 10 cut off. When the conditions causing an arc no longer exist, and the capacitance across the load electrodes increases again, the increase in negative grid voltage of the detecting oscillator 150 restores the amplifier tube 34 to conductive condition. Thereby, the auxiliary relay coil 50 is energized and the keying circuit 74 is restored to its normal condition with the keying relay tube 82 conducting, so that the bias-blocking-voltage source 106 is no longer applied to the grid circuit 138 of the power generator 10. Thus, the power output is automatically restored when the arcing conditions have been removed.

The protective system embodying this invention operates to cut off the power generator within a time period of the order of microseconds. Thus, arcing does not last long enough to do any significant damage. Furthermore, with the detecting circuits shown in Figures 2 and 3, the conditions leading to arcing may be detected and the power generator cut off before the arc has actually formed.

There has been described above an improved protective system for a high-frequency dielectric heating system whereby damage to equipment and work due to arcing may be prevented. The protective system is fast acting, and it utilizes detecting circuits which sense the conditions leading to the formation of an arc so that the arc may be extinguished substantially simultaneously with its formation.

What is claimed is:

1. In a high frequency dielectric heating system wherein a generator including a grid-controlled electron tube supplies high frequency oscillations to load electrodes, an improved protective system therefor comprising a keying circuit coupled to the grid of said electron tube and responsive to a signal pulse for applying a bias blocking potential to the grid of said electron tube, a pulse-producing circuit responsive to a voltage signal received thereby for applying a pulse of predetermined duration to said keying circuit, said pulse-producing circuit including an electron tube having a control grid for receiving said voltage signal to actuate said pulse-producing circuit, and probe means coupled to said load electrodes and responsive to changes of impedance across said electrodes for applying a voltage signal to said pulse producing circuit whereby said generator is cut off upon the formation of an arc across said electrodes.

2. A high frequency dielectric heating system as recited in claim 1 wherein said probe means includes means for detecting changes of voltage at said one electrode.

3. A high frequency dielectric heating system as recited in claim 1 wherein said probe means includes means for detecting changes of resistance between said electrodes.

4. A high frequency dielectric heating system as recited in claim 1 wherein said probe means includes means for detecting changes of capacitance between said electrodes.

5. A high frequency dielectric heating system as recited in claim 1 wherein said keying circuit includes means coupled to said pulse-producing circuit for maintaining the application of said bias blocking potential upon continuance of said change of impedance across said load electrodes.

6. A protective system for a high frequency dielectric heating system wherein a generator having a grid controlled electron control device supplies high frequency oscillations to a work load to be heated through load electrodes, said protective system comprising probe means coupled to said load electrodes and responsive to changes of impedance across said load electrodes for producing voltage signals, a pulse-producing circuit including a grid-controlled electron tube, and means for applying a bias potential of one polarity to said electron tube, said probe means including means for applying a bias potential of opposite polarity and said voltage signals to said electron tube, and a keying circuit coupled to said pulse producing circuit and responsive to pulses therefrom for terminating the power output from said generator.

7. A protective system as recited in claim 6 wherein said probe means includes a rectifier element coupled to said one electrode and a resistance element connected across said rectifier element, said means for applying a bias potential of opposite polarity being connected to said resistance element.

8. A protective system as recited in claim 6 wherein said probe means includes a voltage divider with the impedance across said electrodes forming one element of said voltage divider, said means for applying a bias potential of opposite polarity being connected to said voltage divider.

9. A protective system as recited in claim 6 wherein said probe means includes an oscillator having a frequency lower than the frequency of said generator, said means for applying a bias potential of opposite polarity being coupled to the grid circuit of said oscillator.

10. A protective system as recited in claim 6 wherein said keying circuit includes a circuit for applying a bias blocking potential to the grid of said generator control device, said bias applying circuit comprising a source of said bias blocking potential, a resistor, a current controlling electronic device, means coupling said current controlling electronic device to said pulse-producing circuit whereby said current controlling electronic device is responsive to output pulses from said pulse-producing circuit, said current controlling device and said grid of said generator controlling device being connected in common with said resistor and said source to provide a voltage drop across said resistor polarized to oppose the potential rise across said source, said source being connected to apply a negative potential to said grid, and said keying circuit also including a relay circuit for holding said bias applying circuit in triggered condition, a coil of said relay circuit being connected in series with the anode of said grid-controlled electron tube.

11. A protective system as recited in claim 10 wherein said probe means includes a rectifier having a cathode electrode connected to one of said load electrodes, and a resistance element connected across said rectifier, said means for applying a bias potential of opposite polarity being connected to said resistance element.

12. A protective system as recited in claim 10 wherein said probe means includes a voltage divider, means connecting an intermediate portion of said voltage divider to one of said load electrodes, said means for applying a bias potential of opposite polarity being connected to said voltage divider.

13. A protective system as recited in claim 10 wherein said probe means includes an oscillator having a tenth wavelength greater than the length of said load electrodes, and including means coupling one of said load electrodes to the anode circuit thereof, and a phase-inverter circuit coupled to the grid circuit of said oscillator, said means for applying a bias potential of opposite polarity being connected to said phase-inverter circuit.

14. A protective system for a high frequency dielectric heating system wherein a generator supplies high frequency voltage to work to be heated through load electrodes, said protective system comprising a rectifier element coupled to said load electrodes, a resistance element connected across said rectifier element, an electron control device, first means for applying a bias potential of one polarity to said electron control device, second means connected to said resistance element for applying a bias potential of opposite polarity to said electron control device, and means coupled to said electron control device for terminating the power output from said generator.

15. A protective system for a high frequency dielectric heating system wherein a generator supplies high frequency voltage to work to be heated through a plurality of load electrodes, said protective system comprising a voltage divider, means connecting an intermediate portion of said voltage divider to one of said load electrodes, an electron discharge tube having anode, cathode and control grid electrodes, means for applying a bias potential to the cathode of said tube, means connected to said voltage divider for applying a bias potential to the control grid of said tube, and means coupled to the anode of said tube for terminating the power output from said generator.

16. A protective system for a high frequency dielectric heating system wherein a generator supplies high frequency voltage to work to be heated through a plurality of load electrodes, said protective system comprising an oscillator having a frequency of oscillation such that a tenth wavelength is greater than the length of said load electrodes whereby said oscillator does not substantially affect the voltage distribution along said load electrodes, said oscillator including means coupling said load electrodes to the anode circuit of said oscillator, and means coupled to the grid circuit of said oscillator for terminating the power output from said generator.

17. A protective system as recited in claim 16 wherein said means for stopping said generator includes a phase-inverter circuit coupled to the grid circuit of said oscillator, an electron discharge tube having anode, cathode and control grid electrodes, means for applying a bias potential to the cathode of said tube, and means connected to said phase-inverter circuit for applying a bias potential to the control grid of said tube.

References Cited in the file of this patent

UNITED STATES PATENTS

| | | |
|---|---|---|
| 2,069,854 | Schade | Feb. 9, 1937 |
| 2,300,127 | Maddock | Oct. 27, 1942 |
| 2,349,849 | Deal | May 30, 1944 |
| 2,426,579 | Peckham | Aug. 26, 1947 |
| 2,454,618 | Stone | Nov. 23, 1948 |
| 2,529,560 | Larys | Nov. 14, 1950 |
| 2,548,246 | Walstrom | Apr. 10, 1951 |
| 2,610,288 | Cage | Sept. 9, 1952 |
| 2,638,529 | Gard | May 12, 1953 |